(12) United States Patent
Sharabani

(10) Patent No.: US 8,230,060 B2
(45) Date of Patent: Jul. 24, 2012

(54) WEB BROWSER SECURITY

(75) Inventor: Adi Sharabani, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 12/186,184

(22) Filed: Aug. 5, 2008

(65) Prior Publication Data

US 2010/0036938 A1 Feb. 11, 2010

(51) Int. Cl.
*G06F 15/173* (2006.01)
(52) U.S. Cl. .......... 709/224; 713/150; 709/230
(58) Field of Classification Search .......... 709/230
See application file for complete search history.

(56) References Cited

U.S. PATENT DOCUMENTS

| | | | |
|---|---|---|---|
| 7,340,599 B2 * | 3/2008 | Naccache | 713/150 |
| 7,412,422 B2 * | 8/2008 | Shiloh | 705/74 |
| 2003/0088517 A1 * | 5/2003 | Medoff | 705/59 |
| 2005/0206721 A1 * | 9/2005 | Bushmitch et al. | 348/14.09 |
| 2006/0053219 A1 * | 3/2006 | Kutsumi et al. | 709/224 |
| 2006/0184806 A1 * | 8/2006 | Luttmann et al. | 713/193 |
| 2007/0150965 A1 * | 6/2007 | Redlich et al. | 726/27 |
| 2007/0179985 A1 * | 8/2007 | Knowles et al. | 707/200 |
| 2008/0052641 A1 * | 2/2008 | Brown et al. | 715/811 |
| 2008/0195824 A1 * | 8/2008 | Sadovsky et al. | 711/158 |
| 2008/0303631 A1 * | 12/2008 | Beekley et al. | 340/5.74 |
| 2008/0304458 A1 * | 12/2008 | Aghvami et al. | 370/338 |
| 2009/0049510 A1 * | 2/2009 | Zhang et al. | 726/1 |
| 2009/0055642 A1 * | 2/2009 | Myers et al. | 713/155 |
| 2009/0089366 A1 * | 4/2009 | Toth | 709/203 |
| 2009/0106480 A1 * | 4/2009 | Chung | 711/100 |
| 2009/0125998 A1 * | 5/2009 | Levy | 726/7 |
| 2009/0158441 A1 * | 6/2009 | Mohler et al. | 726/27 |
| 2009/0300722 A1 * | 12/2009 | Haverinen et al. | 726/4 |
| 2010/0010968 A1 * | 1/2010 | Redlich et al. | 707/3 |

* cited by examiner

*Primary Examiner* — Firmin Backer
*Assistant Examiner* — Hamza Algibhah
(74) *Attorney, Agent, or Firm* — Kali Law Group, P.C.

(57) ABSTRACT

A web browser security system including a network detector configured to detect when a computer attempts to connect to a computer network, and a data protector configured to move any data predefined as being private data from any private data areas that are accessible to a web browser on the computer to a secure data repository that is not accessible to the web browser, where any of the network detector and the data protector are implemented in either of computer hardware and computer software and embodied in a computer-readable medium.

16 Claims, 3 Drawing Sheets

WEB BROWSER SECURITY

FIELD OF THE INVENTION

The present invention relates to computer network data security in general, and more particularly to web browser security.

BACKGROUND OF THE INVENTION

Computer users, and especially users of portable computing devices, often connect their computers to different computer networks at different times. These computer networks may be at different locations at a computer user's workplace, such as on different floors of a building, or may be at other locations such as the user's home, airports that the user travels through, and other public and private venues that allow computer network access, and especially Internet access, using wired or wireless connection methods. Unfortunately, connecting to a malicious network or a network that is owned by a malicious attacker might jeopardize sensitive information belonging to the user that is stored in the user's computer. In one particular type of network eavesdropping technique known as a "Man-in-the-Middle" attack, an attacker sets up a computer network, such as a wireless computer network in an airport, to which an unsuspecting computer user connects a portable computer. When the computer user uses a web browser to access web-based information such as the user's bank account, the attacker acts as a conduit for information flow between the computer user and the accessed web site, allowing the attacker to record any private information that the user and the web site exchange, such as cookies, passwords, etc. In some instances the attacker can access private information stored on the user's computer even when the user does not initiate the transmission of such information, and can even store malicious data, such as cookies or cache, onto the user's computer.

SUMMARY OF THE INVENTION

The present invention in embodiments thereof discloses novel systems and methods for web browser security.

In one aspect of the present invention a web browser security system is provided including a network detector configured to detect when a computer attempts to connect to a computer network, and a data protector configured to move any data predefined as being private data from any private data areas that are accessible to a web browser on the computer to a secure data repository that is not accessible to the web browser, where any of the network detector and the data protector are implemented in either of computer hardware and computer software and embodied in a computer-readable medium.

In another aspect of the present invention a web browser security method is provided including detecting when a computer attempts to connect to a computer network, and moving any data predefined as being private data from any private data areas that are accessible to a web browser on the computer to a secure data repository that is not accessible to the web browser.

In another aspect of the present invention a computer-implemented program is provided embodied on a computer-readable medium, the computer program including a code segment operative to detect when a computer attempts to connect to a computer network, and a code segment operative to move any data predefined as being private data from any private data areas that are accessible to a web browser on the computer to a secure data repository that is not accessible to the web browser.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1:
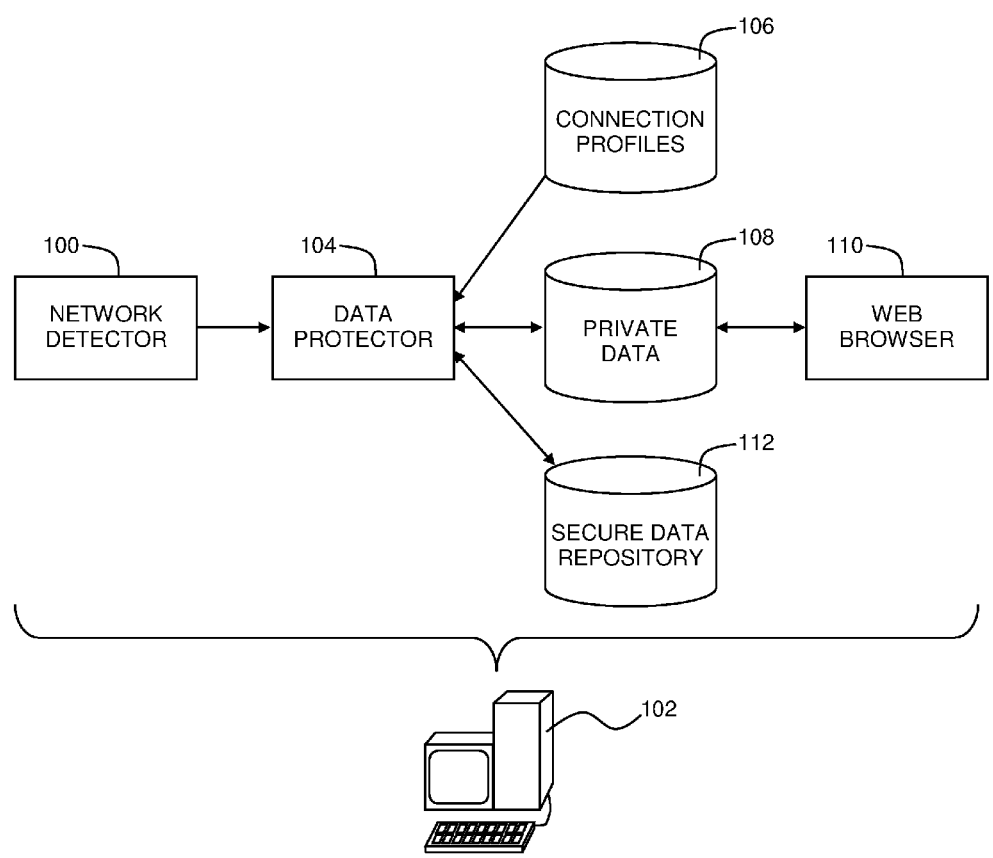
FIG. 1 is a simplified conceptual illustration of a web browser security system, constructed and operative in accordance with an embodiment of the present invention.

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a web browser security system, constructed and operative in accordance with an embodiment of the present invention. In the system of FIG. 1, a network detector 100 detects when a computer 102 connects, or attempts to connect, to a computer network, such as a wired or wireless network that is identified by a network identifier such as a Service Set Identifier (SSID) or any other network identifier. When such a connection or connection attempt is detected, a data protector 104 determines if a predefined connection profile exists for the detected computer network, such as may be stored in a database of connection profiles 106. The connection profile defines one or more actions that data protector 104 is to take regarding private data stored in one or more private data areas 108 that is stored on computer 102 and that are accessible to a web browser 110 on computer 102. Such private data may include cookies, form filler information, browser history information, browser cache information, and any other information that is predefined as being private data. When a connection or connection attempt to a computer network by computer 102 is detected, data protector 104 performs any actions indicated by the connection profile associated with the detected computer network. Each connection profile 106 is associated with a single network, such as by being stored together with a network identifier, or with a group of networks, such as by being stored together with the network identifiers of each network in the group. If no predefined connection profile associated with the detected computer network is found, a default connection profile may be used, or the computer user may be prompted to define a new individual or group connection profile for the detected computer network or add the detected computer network to an existing group connection profile.

In one embodiment a connection profile for a computer network or network group indicates that upon computer 102 connecting to the network data protector 104 is to move all private data from private data areas 108 to a secure data repository 112 that is not accessible to web browser 110, leaving private data areas 108 still accessible to web browser 110, but empty of all private data. In this embodiment, an attacker that relies on the ability of web browser 110 to access private data areas 108 will find that there is no private data to copy or intercept. The connection profile may additionally stipulate that the private data be moved back from secure data repository 112 to private data areas 108 and be made accessible to web browser 110 after network detector 100 detects that computer 102 is no longer connected to the computer network.

In another embodiment a connection profile for a computer network indicates that upon computer 102 connecting to the network or attempting to connect to the network data protector 104 is to leave private data in private data areas 108 accessible to web browser 110. This would typically be applied to networks that are trusted by the user or otherwise known to be secure.

Whether or not private data is moved from private data areas 108, a connection profile may indicate that any new private data generated while computer 102 is connected to the computer network be erased after network detector 100 detects that computer 102 is no longer connected to the computer network. Additionally or alternatively, a connection profile may indicate that any new private data generated while computer 102 is connected to the computer network be moved to secure data repository 112 after network detector 100 detects that computer 102 is no longer connected to the computer network, and stored together with an identifier identifying the computer network or, if the connection profile is for a group of networks to which the current network belongs, stored together with an identifier identifying the group of networks. In this case, the connection profile may indicate that any private data stored in secure data repository 112 in association with the computer network or network group be made accessible to web browser 110 whenever computer 102 connects to, or attempts to connect to, that network or to any network in the network group.

Any of the elements shown in FIG. 1 are preferably executed by or otherwise made accessible to computer 102, such as by implementing any of the elements shown in FIG. 1 in computer hardware and/or in computer software embodied in a computer-readable medium in accordance with conventional techniques.

Figure 2:
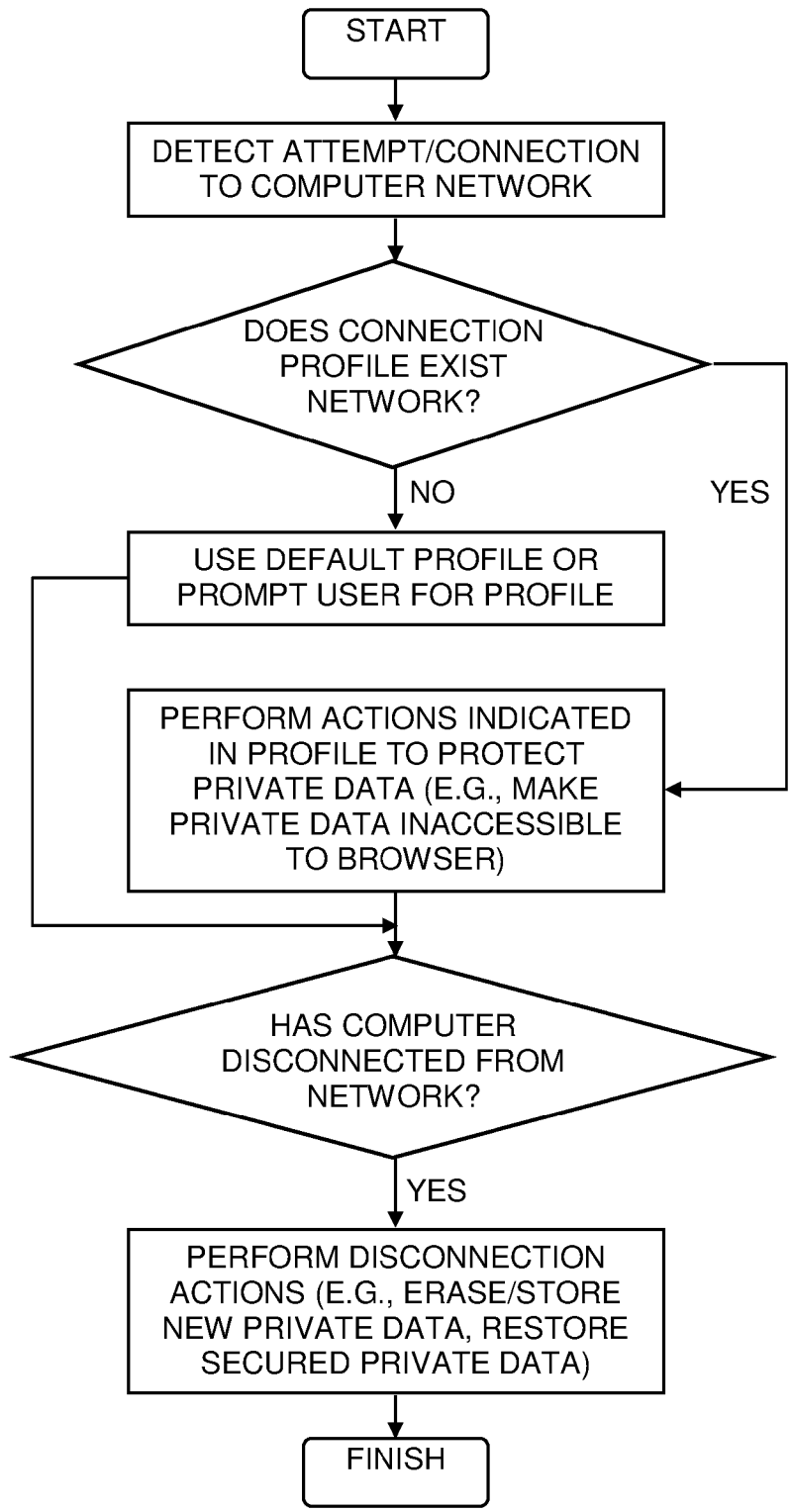
FIG. 2 is a simplified flowchart illustration of an exemplary method of operation of the system of FIG. 1, operative in accordance with an embodiment of the present invention.

Reference is now made to FIG. 2, which is a simplified flowchart illustration of an exemplary method of operation of the system of FIG. 1, operative in accordance with an embodiment of the present invention. In the method of FIG. 2 the connection or attempted connection of a computer to a computer network is detected. If a predefined connection profile does not exist for the detected computer network, either by itself or as part of a group of networks, a default connection profile may be used, or the computer user may be prompted to define a new individual or group connection profile for the detected computer network or add the detected computer network to an existing group connection profile. Any actions indicated in the connection profile are then implemented, such as by performing any of the following if so indicated:

preventing the computer from connecting to the computer network;
  moving any private data to a secure location that is not accessible to the computer's web browser;
  making any private data accessible to the computer's web browser, where the private data was previously stored in connection with the detected computer network;
  making any private data accessible to the computer's web browser, where the private data was previously stored in connection with a group of computer networks to which the detected computer network belongs.

After it is detected that the computer has disconnected from the computer network, any additional default actions and/or actions indicated in the connection profile are then implemented, such as by performing any of the following if so indicated:

erasing any private data generated while connected to the computer network;
  moving any private data generated while connected to the computer network to a secure location that is not accessible to the computer's web browser, and storing the private data together with an identifier identifying the computer network;
  moving any private data generated while connected to the computer network to a secure location that is not accessible to the computer's web browser, and storing the private data together with an identifier identifying a group of computer networks to which the computer network belongs;
  moving any private data back from a secure location, thereby again making the private data accessible to the computer's web browser.

It will be appreciated that selectively controlling a web browser's access to private data based on individual or group network connection profiles provides computer users with a level of security not currently available to them.

Figure 3:
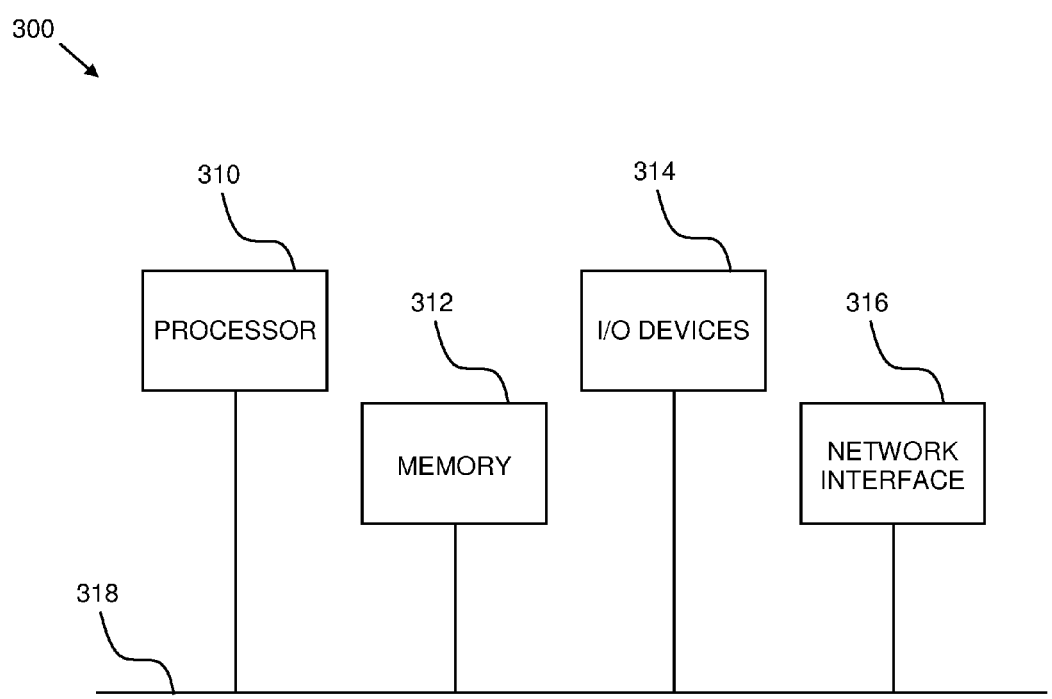
FIG. 3 is a simplified block diagram illustration of an exemplary hardware implementation of a computing system, constructed and operative in accordance with an embodiment of the present invention.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the present invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A web browser security method comprising:
  detecting when a computer attempts to connect to a computer network; and
  electronically securing any data predefined as being private data by moving the private data from any private data areas that are accessible to a web browser on said computer to a secure data repository that is not electronically accessible to said web browser, such that the private data is not electronically accessible by the web browser before the computer connects with the computer network,
    wherein the private data areas remain in electronic communication with the web browser and the computer after the computer connects to the computer network and after the private data is electronically moved, and
    wherein the secure data repository remains in electronic communication with the computer after the computer connects to the computer network and after the private data is electronically moved;

detecting that the computer is no longer connected with the computer network; and electronically unsecuring any of the private data by moving the private data back from the secure data repository to the private data area.

2. A method according to claim 1 and further comprising identifying a predefined connection profile associated with said computer network, wherein said predefined connection profile defines an action indicating that any of said private data should be electronically moved to said secure data repository, and wherein said moving step comprises electronically moving said private data in accordance with said action.

3. A method according to claim 1 wherein said moving step comprises electronically securing said private data upon detecting said connection attempt.

4. A method according to claim 1 wherein said moving step comprises electronically moving said private data upon detecting that said computer is connected to said network.

5. A method according to claim 1 and further comprising:
detecting that computer is no longer connected to said computer network; and
erasing any new private data, generated while said computer is connected to said computer network, after detecting that said computer is no longer connected to said computer network.

6. A method according to claim 1 and further comprising:
detecting that computer is no longer connected to said computer network; and
storing any new private data, generated while said computer is connected to said computer network, in association with either of said network and a network group after detecting that said computer is no longer connected to said computer network.

7. A method according to claim 6 and further comprising making any of said private data previously stored in association with said computer network accessible to said web browser after detecting that said computer attempts to connect to said computer network.

8. A method according to claim 6 and further comprising making any of said private data previously stored in association with said network group accessible to said web browser after detecting that said computer attempts to connect to any network in said network group.

9. A computer-implemented program for providing web browser security, the computer-implemented program comprising:
a non-transitory computer readable medium;
a code segment operative to detect when a computer attempts to connect to a computer network; and
a code segment operative to secure any data predefined as being private data by moving the private data from any private data areas that are accessible to a web browser on said computer to a secure data repository that is not electronically accessible to said web browser, such that the private data is not electronically accessible by the web browser before the computer connects with the computer network,
wherein the private data areas remain in electronic communication with the web browser and the computer after the computer connects to the computer network and after the private data is electronically moved, and
wherein the secure data repository remains in electronic communication with the computer after the computer connects to the computer network and after the private data is electronically moved;
a code segment to detect that computer is no longer connected to the computer network; and
a code segment to electronically unsecure any of the private data by moving the private data back from the secure data repository to the private data area.

10. A computer-implemented program according to claim 9 and further comprising: a code segment operative to identify a predefined connection profile associated with said computer network, wherein said predefined connection profile defines an action indicating that any of said private data should be electronically moved to said secure data repository, and wherein said code segment operative to move comprises electronically moving said private data in accordance with said action.

11. A computer-implemented program according to claim 9 wherein said code segment operative to move comprises electronically securing said private data upon detecting said connection attempt.

12. A computer-implemented program according to claim 9 wherein said code segment operative to move comprises electronically moving said private data upon detecting that said computer is connected to said network.

13. A computer-implemented program according to claim 9 and further comprising:
a code segment operative to detect that computer is no longer connected to said computer network; and
a code segment operative to erase any new private data, generated while said computer is connected to said computer network, after detecting that said computer is no longer connected to said computer network.

14. A computer-implemented program according to claim 9 and further comprising:
a code segment operative to detect that computer is no longer connected to said computer network; and
a code segment operative to store any new private data, generated while said computer is connected to said computer network, in association with either of said network and a network group after detecting that said computer is no longer connected to said computer network.

15. A computer-implemented program according to claim 14 and further comprising a code segment operative to make any of said private data previously stored in association with said computer network accessible to said web browser after detecting that said computer attempts to connect to said computer network.

16. A computer-implemented program according to claim 14 and further comprising a code segment operative to make any of said private data previously stored in association with said network group accessible to said web browser after detecting that said computer attempts to connect to any network in said network group.

* * * * *